Figure 1:
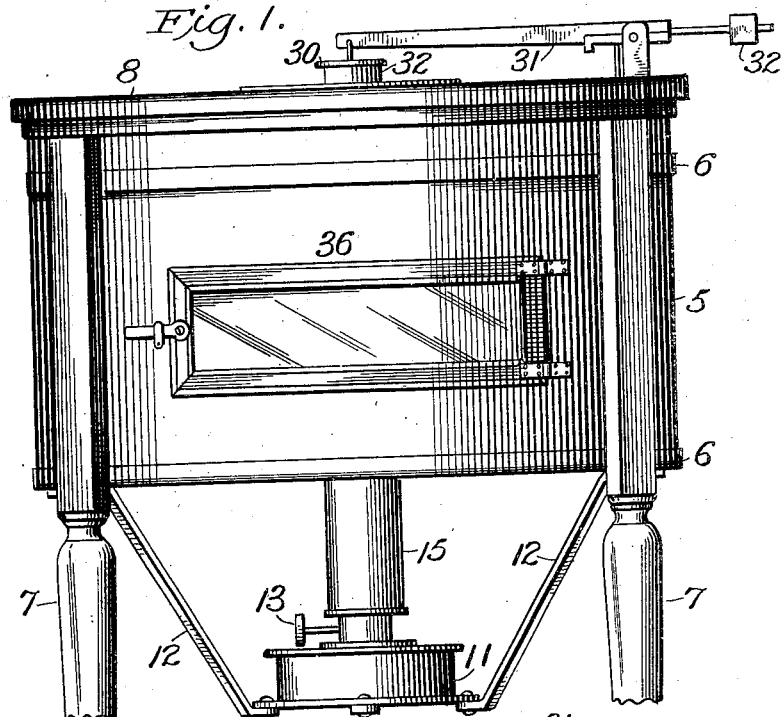

No. 877,833.

C. DAHL.
INCUBATOR.
APPLICATION FILED JAN. 23, 1907.

PATENTED JAN. 28, 1908.

2 SHEETS—SHEET 1.

WITNESSES
James F. Duhamel.
Aimee Brown.

INVENTOR
Christ Dahl,
BY
Victor J. Evans
ATTORNEY

No. 877,833.

PATENTED JAN. 28, 1908.

C. DAHL.
INCUBATOR.
APPLICATION FILED JAN. 23, 1907.

2 SHEETS—SHEET 2.

WITNESSES
James F. Duhamel
Aimee Brown

INVENTOR,
Christ Dahl,
BY
Victor J. Evans
ATTORNEY

UNITED STATES PATENT OFFICE.

CHRIST DAHL, OF BROOKLYN, NEW YORK.

INCUBATOR.

No. 877,833.          Specification of Letters Patent.          Patented Jan. 28, 1908.

Application filed January 23, 1907. Serial No. 353,721.

*To all whom it may concern:*

Be it known that I, CHRIST DAHL, a citizen of the United States, residing at Brooklyn, in the county of Kings and State of New York, have invented new and useful Improvements in Incubators, of which the following is a specification.

This invention relates to incubators and has for its object the disposition of the eggs around the heating means so that they will be comparatively at the same distance from same and at the same time the cool and foul airs are removed from the incubator and the necessary moisture is provided, as will be further explained in the following specification pointed out in the appended claims and illustrated in the accompanying drawings, where like reference characters are used to designate the same parts in the various figures.

Figure 2:
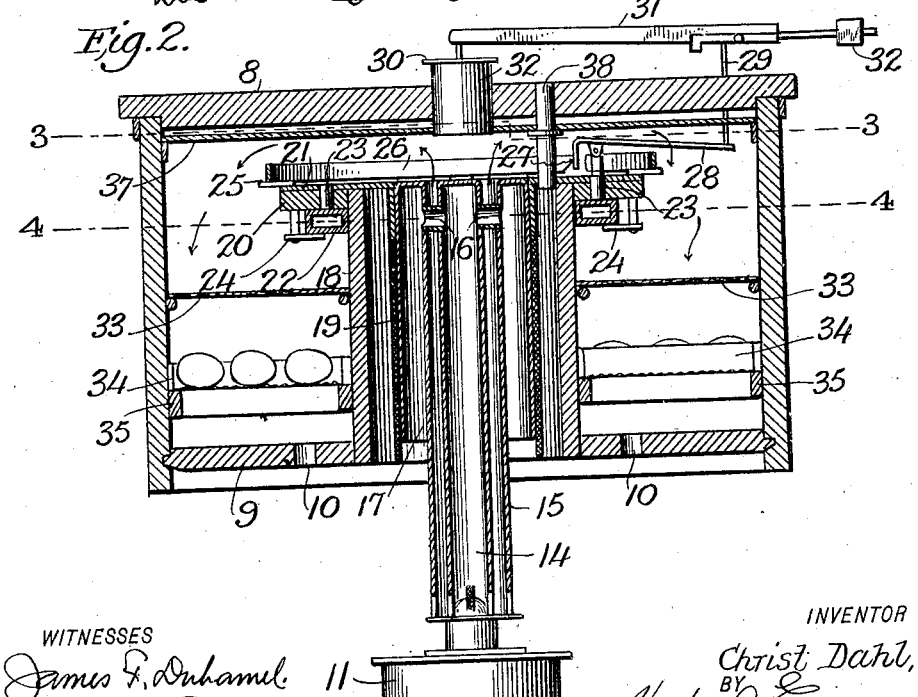
Figure 3:
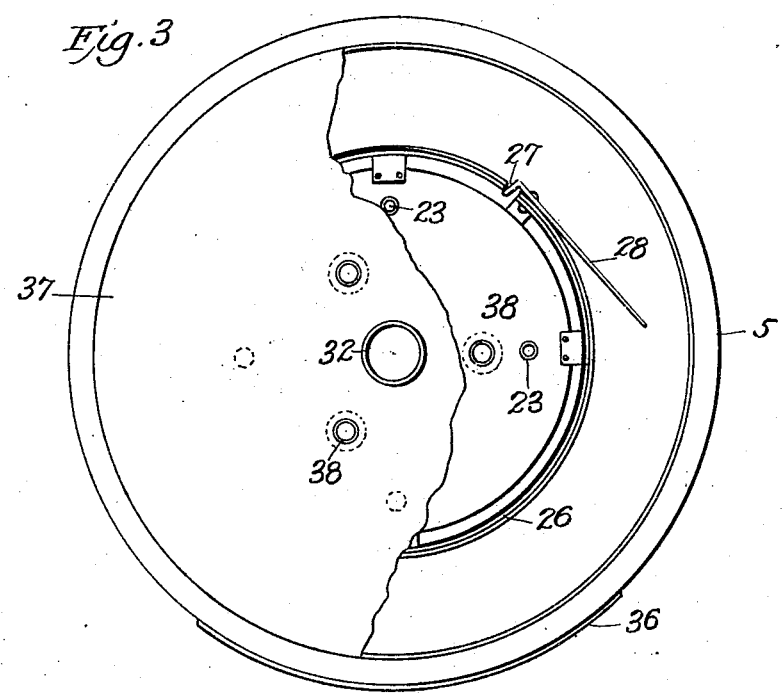
Figure 4:
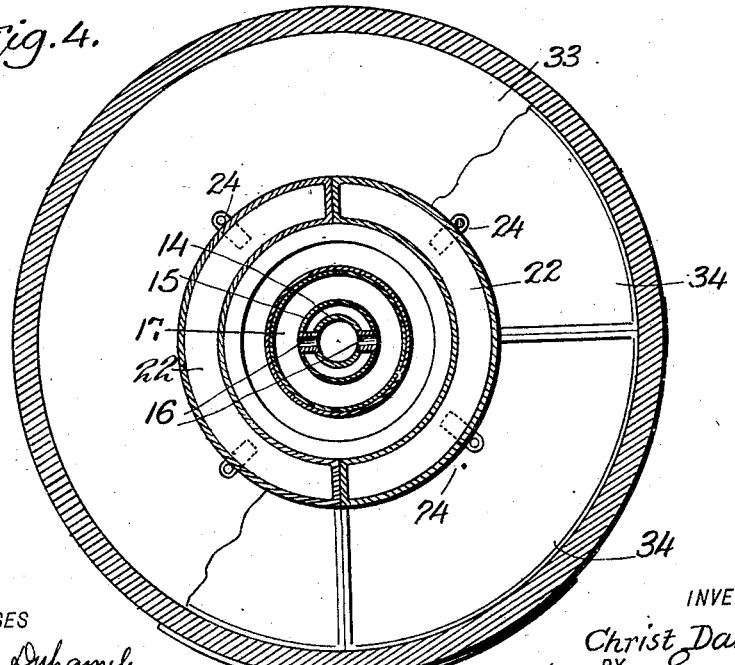

Figure 1 is a front elevation of the improved incubator. Fig. 2 is a vertical sectional view of the same. Fig. 3 is a horizontal sectional view on the line 3—3. Fig. 4 is a horizontal sectional view on the line 4—4 of Fig. 2.

It is the object of this invention to provide heating means for an incubator which will distribute the warm air to the eggs at approximately even temperature no matter where they are placed in the apparatus at the same time to relieve the egg chamber from the hot and smoky atmosphere and provide it with proper ventilation and moisture.

The incubator consists of an apparatus of circular structure 5 and is made of wood or other suitable material, and held together by bands 6 and supported by the legs 7. In fitting the parts together a top 8 is provided which may be also of wood and fit down closely upon the structure 5 and a bottom 9 having ventilating holes 10 is also provided for the bottom of the incubator.

The heating device consists of the lamp 11 which is suspended by means of hangers 12 from the bottom of the incubator and is provided with the usual adjusting means 13 for the wick, and the burner is surrounded by the two cylinders 14 and 15, the former carrying the flame and heated air upward into the body of the incubator and by means of the lateral flues 16 discharging same into a circular chamber 17 which after it becomes cool drops toward the bottom of the device thus carrying off the smoke and impure products of combustion. In this movement of the flame the surrounding cylinder 15 and the air therein becomes heated, the air passing out towards the top of the incubator and falling through the eggs towards the bottom 9 and out of the openings 10. Surrounding the circular chamber 17 is a cylinder or wall 18 which forms one of the inclosing means of the incubator, and surrounding the outside of the chamber 17 is a layer of asbestos or similar material 19 which is adapted to protect the wall 18, which is usually of wood, from danger of ignition.

At the upper end of the wall 18 is a platform 20 which supports a disk 21 carrying the tubes 14 and 15 and the cylinder inclosing the chamber 17. Secured to the under surface of the platform 20 is a circular box 22 having outlets 23 for the distribution of the water carried within the boxes and which is to provide moisture for the interior of the incubator so that the air will be of proper humidity for the hatching of the eggs. These boxes 22 are shown more clearly in Fig. 4 and they are held in place by means of the turn-buttons 24 pivoted to the lower side of the platform 20.

On the upper side of the platform are radial arms 25 which support a thermostat 26 which as it expands operates the end 27 of the lever 28 so as to elevate a rod 29 and elevates the cap 30 on the outer end of the lever 31 and opens the outlet 32 and deflects the heat upward and away from the opening 10. The outer end of the lever 31 is provided with the weight 32 to properly adjust it so it will properly operate the disk 30.

In order to evenly distribute the heat throughout this incubator and down upon the eggs, the heated air passes through the diaphragm 33 of bolting cloth or similar material of thin texture and falls upon the eggs in the trays 34, which are in this instance arranged in sections made up of four parts and carried on the cleats 35. It will thus be seen that after the heat is thus evenly distributed and thrown upon the eggs it then passes through the foraminous material which forms the bottoms of the sections 34 and is free to pass out of the openings 10. The bottom of the sections 34 may be of netting or wire cloth on which the eggs are deposited and these sections are put in the door 36 and slid around the cleats 35 until they are properly disposed. In order to prevent the escape of the heated air a supplemental metallic covering 37 is arranged beneath the wooden top 8 in order to deflect the heated air and throw it downward, and in order to carry off any unnecessary amount of heated air and to prevent the sides 18 from becoming overheated I provide the inclosure within same with several outlets 38 which carry the overheated air to the outside of the incubator and relieve it of any danger of the wood work becoming ignited.

It is obvious that various modifications may be adopted in the construction of this incubator and its various parts without departing from the essential features above described.

What we claim as new and desire to secure by Letters Patent is:

1. An incubator having a box or body, a structure therein forming a chamber open at its lower side, heat radiating means extending upwardly in and discharging from the bottom of said chamber, and an air inlet duct heated by said heat radiating means and discharging into the upper portion of said box of the body.

2. An incubator comprising a box or body having ventilating openings in its lower side, a structure in said box or body forming a chamber therein, means extending through the said chamber to supply fresh air to such box or body, means to heat such chamber and cause the latter by radiation to heat the air in the box or body, a platform on such heater, evaporating pans on the under side of and connected to such platform, a thermostat on such platform, and a ventilating device in the upper portion of said box or body including a movable element, and operating means for such movable element, actuated by such thermostat.

3. An incubator having a structure therein forming a heat radiating chamber and provided at its upper end with a platform projecting beyond the sides thereof, evaporating pans under such platform and having tubes extending upwardly through such platform, and supporting devices for the said evaporating pans, depending from such platform and including buttons to be turned into and out of engagement with the bottoms of the evaporating pans.

4. An incubator comprising a box or body, a heat radiating element in the center thereof, egg trays in the lower portion of such box or body around such heat radiating device, a fabric above the egg trays and between the outer wall of such box or body and the heat radiating device, and means in the upper portion of such box or body to supply moisture thereto, such box or body having ventilating openings in its lower side.

In testimony whereof I affix my signature in presence of two witnesses.

CHRIST DAHL

Witnesses:
JAMES F. DUHAMEL,
H. G. HOSE.